Feb. 26, 1957　　H. G. F. ROESSLER　　2,782,884
DETACHABLE JOINT MEANS FOR RIGIDLY CONNECTING
AN IMPLEMENT TO A TRACTOR
Filed Jan. 31, 1952
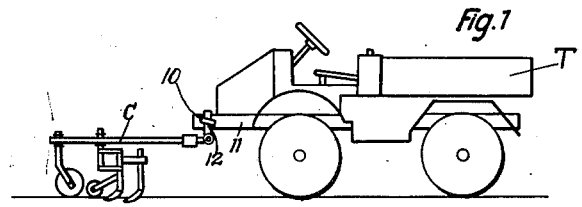
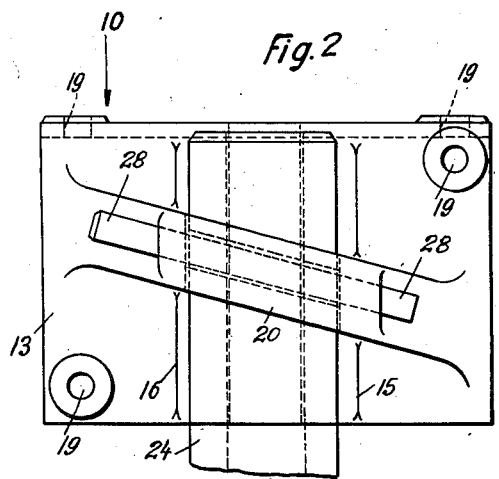
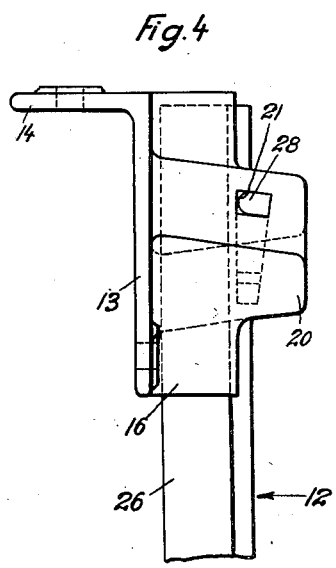
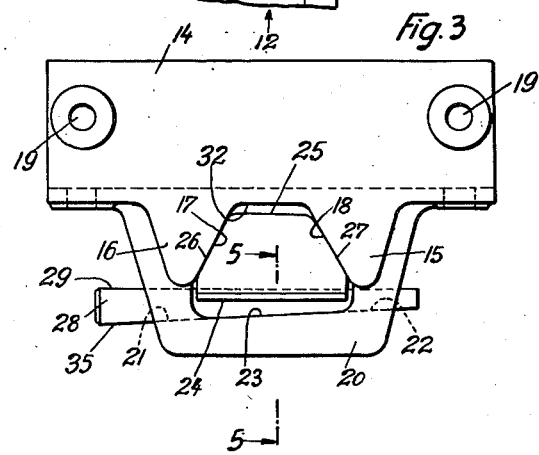
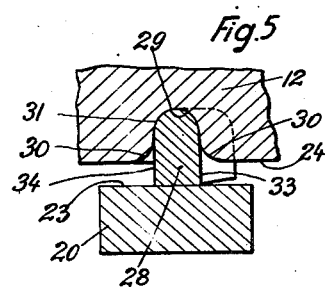
Inventor
Heinrich G. F. Roessler
By　Attorneys

United States Patent Office 2,782,884
Patented Feb. 26, 1957

2,782,884

DETACHABLE JOINT MEANS FOR RIGIDLY CONNECTING AN IMPLEMENT TO A TRACTOR

Heinrich G. F. Roessler, Gaggenau, Germany, assignor to Daimler-Benz Aktiengesellschaft, Stuttgart-Unterturkheim, Germany Application January 31, 1952, Serial No. 269,219

4 Claims. (Cl. 189—36)

My invention relates to a coupling for connecting two members for ready detachment, such as a tractor and a cultivating implement.

It is the object of my invention to provide a coupling capable of attaching two members to one another without any lost motion in anyone of the three-dimensional directions, to provide a coupling of that kind which may be readily disengaged in a simple and easy manner, and which lends itself to manufacture at a low cost.

It is a further object of the present invention to provide a coupling comprising a female member and a male member which are kept in engaged relationship by a releasable wedge, said wedge eliminating any lost motion between the two members.

Further objects of the present invention will appear from the description hereinafter of a preferred embodiment of my invention, and the features of novelty will be pointed out in the claims.

In the drawing the invention is illustrated as applied to the connection of a tractor with a cultivating implement, wherein:

Fig. 1 illustrates an elevation of the tractor and the implement connected thereto by means of the improved coupling, Fig. 2 is an elevation on an enlarged scale of the coupling, Fig. 3 is a plan view of the Fig. 2, Fig. 4 is a side view, and Fig. 5 is the partial section taken along line 5—5 of Fig. 3 on a still larger scale.

In Fig. 1 I have shown the attachment of a cultivator C to a tractor T by means of the improved coupling device forming the subject matter of the present invention.

The coupling device comprises a female member formed by a bracket designated as a whole by the reference numeral 10 and bolted to the chassis 11 of the tractor T, and a male member 12 attached to the cultivator C.

The bracket 10 comprises a vertical base plate 13 integral with an upper horizontal flange 14 and with two vertical parallel ridges 15 and 16 having opposed relatively inclined sides 17 and 18. Moreover, the base plate 13 and the flange 14 are provided with holes 19 for the insertion of bolts by which the bracket 10 may be attached to the chassis 11. Further the base plate 13 is integral with a bridge portion 20 which extends across the space between the two ridges 15 and 16. The bridge portion has two lateral openings 21 and 22 which are contiguous with the internal top face 23 of the bridge portion.

The male member 12 is substantially prismatic having a top face 24, a bottom face 25 and side faces 26 and 27, the latter converging from the top face 24 towards the bottom face 25 and including substantially the same angle as do the sides 17 and 18 of the two ridges 15 and 16. As will appear from Figs. 2 and 3, the prismatic male member 12 is so shaped that it may be readily slipped in place between the ridges 15 and 16 of the female member and beneath the bridge portion 20 of the latter for full face contact of the sides 17 and 18 of the ridges with the side faces 26 and 27 of the male member.

In order to hold the male member securely in position, a wedge 28 may be inserted through the opening 21 between the male member 12 and the internal top face 23 of the bridge portion 20. As will appear from Fig. 3, the internal face 23 of the bridge portion 20 and the top face 24 of the male member 12 converge towards the right, and the co-ordinated faces 29 and 35 of the wedge 28 converge in a corresponding manner. Therefore, the wedge 28, if firmly driven in place, will urge the male member 12 into intimate contact with the two ridges 15 and 16, whereby the male member 12 and the female member 10 will be firmly held against any relative angular motion.

In order to prevent any relative sliding motion lengthwise of the ridges 15 and 16, the top face 24 of the male member is preferably provided with a transverse groove which extends beneath the bridge portion 20 when the prismatic member 12 is inserted between the ridges 15 and 16. As shown in Fig. 5, the groove which accommodates the wedge 28 has preferably a rounded bottom 29 and rounded edges 30. The wedge has a rounded bottom face 31 for full surface contact with the bottom 29 of the groove.

Preferably the wedge 28 has a length permitting both ends of the wedge, when placed in position, to project out of the bridge portion 20, whereby the wedge may be easily tightened or released by delivering a few hammer blows upon its respective end. It will be also noted from Fig. 2 that the bridge portion 20 extends obliquely across the base plate 13, the tapering end of the wedge thus pointing slightly in a downward direction. In this manner, the wedge 28 is not liable to get lost should it become loose accidentally, but will be held by its gravity in position with the bridge portion 20. In practice, a chain may be provided to connect the wedge 28 with the bracket 10 so that it cannot get lost.

From the foregoing description it will appear that the space between the two ridges 15 and 16 constitutes a groove of a width tapering towards the bottom 32 of the groove, and it will also appear that the openings 21 and 22 of the bridge portion 20 constitute a passage that extends transversely to the internal mating faces 17 and 18 which contact the side faces 26 and 27 of the male member 12.

The lateral faces 33 and 34 of the wedge 28 are preferably parallel to one another and are so spaced that the wedge will fit the transverse groove of the male member 12 without any substantial clearance. In this manner, the improved coupling device will firmly hold the female member 10 and the male member 12 against any relative displacement.

Because of the substantial clearance provided between the internal face 23 of the bridge and the top face 24 of the male member, the latter may be easily slipped in placed and may then be fixed by insertion of the wedge 28. Similarly, the coupling device permits a quick and ready detachment by removal of the wedge and by the subsequent disengagement of the male member 12 from the female member 10.

While I have described a preferred embodiment of my invention, I wish it to be clearly understood that the latter is in no way limited to the details of such embodiment, but is capable of numerous modifications within the scope of the appended claims.

What I claim is:

1. A readily disengageable coupling for connecting an agricultural implement to the front of a tractor to push said implement by said tractor, comprising a bracket having a base plate and provided with a female member, said female member being formed by a portion of said base plate, a pair of vertical parallel ridges with opposed inclined sides relative to each other and a bridging member integral with and extending across said ridges at a distance from said base plate, said bridging member being provided with a pair of spaced lateral openings contiguous with the internal top face of said bridging member, the axes of said openings being essentially parallel with said internal top face and extending in the direction of said bridging member across said ridges, means for securing said bracket to said tractor, a male member secured to said implement for insertion into said female member, said male member being of complementary shape with said female member for full contact with said opposed inclined sides but of lesser dimension in the direction of said distance, and a wedge member for insertion into said lateral openings to hold said male and female members in fixed position against relative angular movement, said wedge member extending transversely of said male member and being supported by said bridging member to prevent deformation of said wedge member as a result of the moment around the vertical axis of the male member produced by the forces on said implement during pushing thereof.

2. A readily disengageable coupling for connecting an agricultural implement to the front of a tractor to push said implement by said tractor, comprising a bracket having a base plate and provided with a female member, said female member being formed by a portion of said base plate, a pair of parallel ridges with opposed inclined sides relative to each other and a bridging member integral with and extending across said ridges at a distance from said base plate, said bridging member being provided with a pair of spaced lateral openings contiguous with the internal top face of said bridging member, the axes of said openings being essentially in alignment with each other and parallel with said internal top face and extending in the direction of said bridging member across said ridges, means for securing said bracket to said tractor, a male member secured to said implement for insertion into said female member, said male member being of complementary shape with said female member for full contact with said oposed inclined sides but of lesser dimension in the direction of said distance and provided with a transverse groove extending beneath said bridging member essentially parallel to said aligned axes with said male member inserted in its assembled position in said female member, and a wedge member for insertion into said lateral openings to engage said groove and to hold said male and female members in fixed position against relative angular and vertical axial movements, said wedge member extending transversely of said male member and being supported by said bridging member to prevent deformation of said wedge member as a result of the moment around the vertical axis of the male member produced by the forces on said implement during pushing thereof.

3. A readily disengageable coupling having a bracket member for connection with a tractor and a male member for connection with an agricultural implement to be pushed by said tractor in front thereof, said bracket member having a base plate, a pair of vertical parallel ridges with opposed inclined sides relative to each other and a bridging member integral with and extending across said ridges at a distance from said base plate, a portion of said base plate, said ridges and said bridging member forming a female member for receiving said male member, said bridging member being provided with a pair of spaced lateral openings contiguous with the internal top face of said bridging member, the axes of said openings being essentially aligned and parallel to said internal top face and extending in the direction of said bridging member across said ridges, said male member being of complementary shape with said female member for full contact with said opposed inclined sides but of lesser dimension in the direction of said distance, and a wedge member for insertion into said lateral openings to hold said male and female members in fixed position against relative angular movement about an axis parallel to said ridges, said wedge member extending transversely of said male member and being supported by said bridging member to prevent deformation of said wedge member as a result of the moment around the vertical axis of the male member produced by forces on said implement during pushing thereof.

4. A readily disengageable coupling having a bracket member for connection with a tractor and a male member for connection with an agricultural implement to be pushed by said tractor in front thereof, said bracket member having a base plate, a pair of vertical parallel ridges with opposed inclined sides relative to each other and a bridging member integral with and extending across said ridges at a distance from said base plate, a portion of said base plate, said ridges and said bridging member forming a female member for receiving said male member, said bridging member being provided with a pair of spaced lateral openings contiguous with the internal top face of said bridging member, the axes of said openings being essentially aligned and parallel to said internal top face and extending in the direction of said bridging member across said ridges, said male member being of complementary shape with said female member for full contact with said opposed inclined sides but of lesser dimension in the direction of said distance and provided with a transverse groove extending essentially parallel to said aligned axes with said male member inserted in its assembled position in said female member, and a wedge member for insertion into said lateral openings to hold said male and female members in fixed position against relative angular movement about an axis parallel to said ridges, said wedge member extending transversely of said male member and being supported by said bridging member to prevent deformation of said wedge member as a result of the moment around the vertical axis of the male member produced by forces on said implement during pushing thereof.

References Cited in the file of this patent

UNITED STATES PATENTS

| Number | Name | Date |
|---|---|---|
| 323,705 | Maunder | Aug. 4, 1885 |
| 367,115 | Palmer | July 26, 1887 |
| 792,065 | Myers | June 13, 1905 |
| 943,469 | Schade | Dec. 14, 1909 |
| 1,557,589 | Jenkins | Oct. 20, 1925 |
| 2,236,826 | Maynes | Apr. 1, 1941 |
| 2,478,948 | Shepler | Aug. 16, 1949 |
| 2,554,375 | Morreale | May 22, 1951 |
| 2,640,674 | Gerlach | June 2, 1953 |

FOREIGN PATENTS

| Number | Country | Date |
|---|---|---|
| 81,980 | Germany | July 3, 1895 |
| 2,122 | Great Britain | of 1909 |